UNITED STATES PATENT OFFICE.

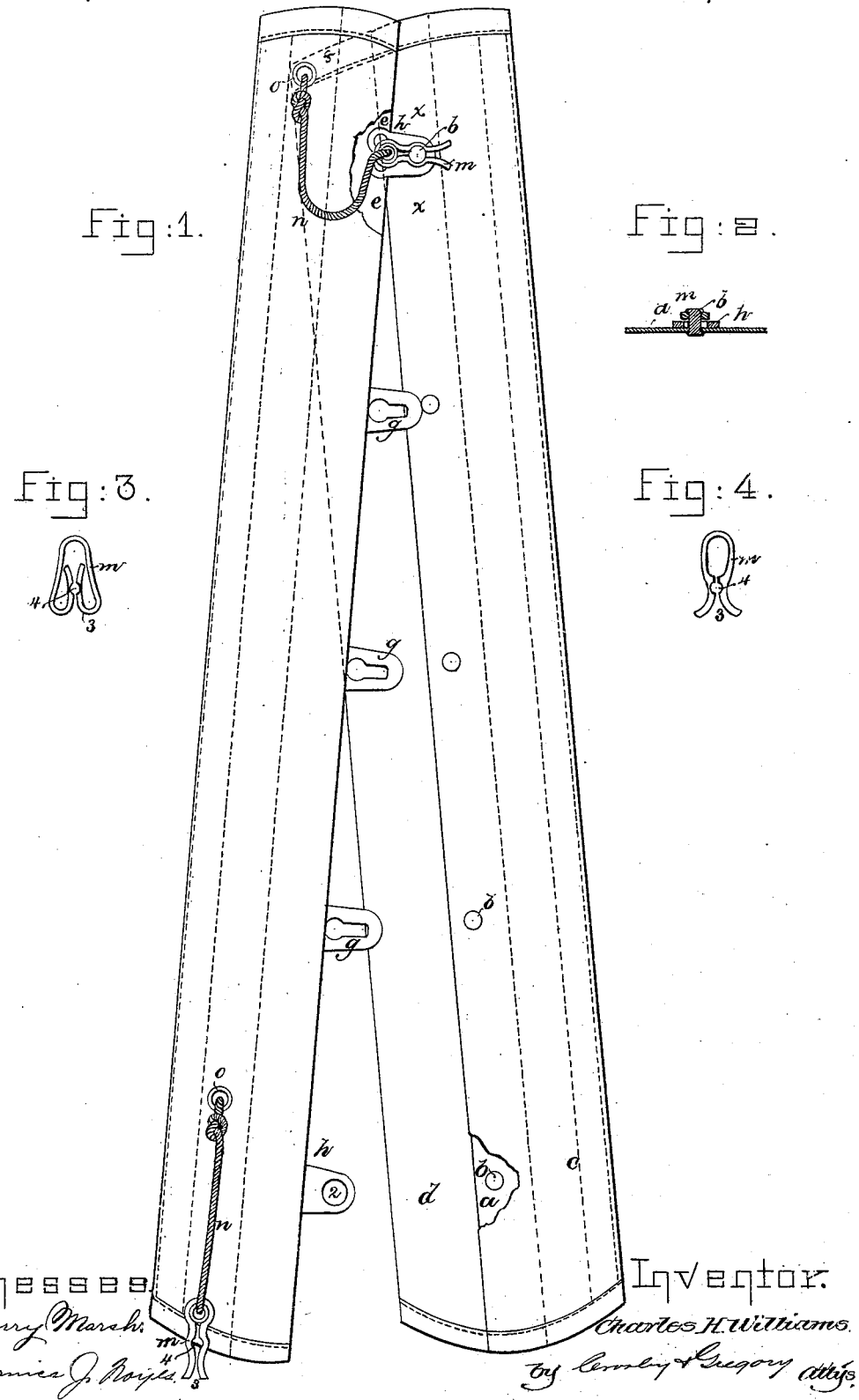

CHARLES H. WILLIAMS, OF WORCESTER, ASSIGNOR TO THEODORE C. BATES, OF NORTH BROOKFIELD, MASSACHUSETTS.

CORSET-FASTENING.

SPECIFICATION forming part of Letters Patent No. 312,054, dated February 10, 1885.

Application filed May 26, 1884. (No model.)

*To all whom it may concern:*

Be it known that I, CHARLES H. WILLIAMS, of Worcester, county of Worcester, State of Massachusetts, have invented an Improvement in Corset-Steel Fastenings, of which the following description, in connection with the accompanying drawings, is a specification, like letters on the drawings representing like parts.

In this my invention the eye-plate attached to one steel is provided with an opening a little larger in diameter than the head of the stud attached to the other steel, and the shank of the stud below or at its head, after the stud has been passed through the eye-plate, is engaged by means of a spring clip or fork, which is made to engage or embrace the stud near or at its head and prevent the stud from being retracted or drawn back through the eye-plate. The spring clip or fork is joined with the corset by means of a flexible connection, preferably a cord.

Figure 1 represents a sufficient portion of the front of a corset to illustrate my invention; Fig. 2, a section on the line $x\ x$, and Figs. 3 and 4 modified forms of clips or forks.

The steel $a$, having headed studs $b$, the cloth portion $c$, the steel protector $d$, the steel $e$, cloth portion $f$, and slotted eye-plates $g$, are all as usual and common. Near its upper and lower end the steel $e$ is provided with the plates $h$, having, as herein shown, round holes for the passage of the headed studs $b$, as shown at the upper part of Fig. 1, the said studs, after having been passed through the said holes, having applied to them at or just under their heads the clips or forks $m$, attached by flexible connections or cords $n$ to the corset part $f$ at $o$. The clip or fork, preferably made from sheet metal, and as a spring, has beveled portions 3, to enable it to be readily passed over the stud, and has a recess, 4, to embrace the stud.

Figs. 3 and 4 show modified forms of clips or forks, the one shown at Fig. 3 being composed of wire.

I do not desire to limit my invention to the exact construction of clip or fork represented; nor do I desire to limit my invention to the shape of the hole or opening in the eye-piece $h$.

I claim—

A corset-steel provided with a plate, $h$, having an opening for the passage of a stud, and a steel provided with a stud, combined with an independent removable clip or fork having a recess, substantially as described, to embrace the stud, and to be retained thereon after the stud has been passed through the hole in the said plate, substantially as set forth.

In testimony whereof I have signed my name to this specification in the presence of two subscribing witnesses.

CHAS. H. WILLIAMS.

Witnesses:
H. H. FAIRBANKS,
BENJ. L. SAMPSON.